United States Patent [19]
Leckschat

[11] Patent Number: 6,134,522
[45] Date of Patent: *Oct. 17, 2000

[54] SIGNAL PROCESSING METHOD AND ARRANGEMENT FOR SUBSTITUTION OR ERRONEOUS SIGNALS IN A BLOCK-CODED AUDIO SIGNALS OF AN AUDIO COMMUNICATION SYSTEM

[75] Inventor: Dieter Leckschat, Bocholt, Germany

[73] Assignee: Siemens Aktiengesellschaft, Munich, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/776,725

[22] PCT Filed: Aug. 1, 1995

[86] PCT No.: PCT/DE95/00997

§ 371 Date: Jan. 31, 1997

§ 102(e) Date: Jan. 31, 1997

[87] PCT Pub. No.: WO96/04653

PCT Pub. Date: Feb. 15, 1996

[30] Foreign Application Priority Data

Aug. 2, 1994 [DE] Germany .............. 44 27 351

[51] Int. Cl.$^7$ .................................................. G06F 11/20
[52] U.S. Cl. ........................................... 704/226; 714/747
[58] Field of Search ............................. 375/217; 364/737, 364/734; 371/10.2, 31, 37.8, 41; 395/186; 714/500, 226, 228, 747

[56] References Cited

U.S. PATENT DOCUMENTS

| | | | |
|---|---|---|---|
| 3,860,760 | 1/1975 | Rittenbach | 704/502 |
| 3,989,897 | 11/1976 | Carver . | |
| 4,375,581 | 3/1983 | Jayant | 375/241 |
| 4,593,392 | 6/1986 | Kouyama | 714/747 |
| 4,716,565 | 12/1987 | Suma | 714/747 |
| 4,829,523 | 5/1989 | Bretl | 714/747 |
| 5,339,321 | 8/1994 | Paek . | |
| 5,572,622 | 11/1996 | Wigren et al. | 704/228 |

FOREIGN PATENT DOCUMENTS

| | | |
|---|---|---|
| 62-286304 | 12/1987 | Japan . |
| WO 85/05723 | 12/1985 | WIPO . |
| WO 94/10769 | 5/1994 | WIPO . |
| WO 94/10812 | 5/1994 | WIPO . |

OTHER PUBLICATIONS

Muller et al "A codec for the GSM half rate speech channel" 1994, IEEE, I257–I260.

Plenge et al "Combined channel coding and concealment" 1993, IEEE, 3/1–3/8.

Patent Abstracts of Japan, vol. 18, No. 195, (E–1533), Apr. 15, 1994; & JP5347594, Dec. 27, 1993.

Patent Abstracts of Japan, vol. 17, No. 50, (E–1314), Jan. 29, 1993 & JP4263528, Sep. 18, 1992.

Phillips Telecommunication Review: vol. 49, No. 3, DECT, A Universal Cordless Access System, R.J. Mulder, pp. 68–73.

*Primary Examiner*—David R. Hudspeth
*Assistant Examiner*—Harold Zintel
*Attorney, Agent, or Firm*—Hill & Simpson

[57] ABSTRACT

In order to improve the transmission quality of block-coded audio signals in audio communications systems, for example in DECT cordless telephones, when transmission errors occur, in such a manner that the requirement for computation power and thus the costs are minimal and no additional delay occurs to the audio signal to be transmitted, pauses in the audio signal which are caused by transmission errors are replaced by a pause-specific substitution signal which is generated in advance. In the simplest case, the substitution signal is generated by the signal section which immediately precedes a given signal section of the audio signal being buffer-stored and, if the given signal section is disturbed, being inserted into the gap which is produced by the disturbance.

21 Claims, 9 Drawing Sheets

SIGNAL PROCESSING METHOD AND ARRANGEMENT FOR SUBSTITUTION OR ERRONEOUS SIGNALS IN A BLOCK-CODED AUDIO SIGNALS OF AN AUDIO COMMUNICATION SYSTEM

BACKGROUND OF THE INVENTION

The invention relates to a signal processing method and apparatus for block-coded audio signals of a communication system.

Transmitting and receiving devices are used for message processing and transmission in communications systems having a message transmission path between a message origin and a message destination. The message produced by the message origin is transmitted by the transmitting device via a message channel to the receiving device, which subsequently emits the received message to the message destination. The message processing and transmission can in this case be carried out in a preferred transmission direction or in both transmission directions (duplex operation).

"Message" is a generic term which represents both the meaning content (information) and the physical representation (signal). Signals may represent, for example,
(1) pictures,
(2) spoken words,
(3) written words,
(4) encrypted words or pictures.
The type of transmission according to (1), (2) and (3) is in this case normally characterized by continuous (analog) signals, while non-continuous signals (for example pulses, digital signals) are normally produced for the type of transmission according to (4).

The present invention primarily relates to the transmission of audio messages (for example voice or music messages, etc.). However, it can also be applied to other messages, such as appropriately processed video messages, for example.

Either continuous signals (pure analog signals) or a mixture of continuous and non-continuous signals occur as possible signal forms for an audio communications system, using A/D (analog to digital) converters and D/A (digital to analog) converters. Devices which are specific to the message type are in each case required for the functions of "transmitting" and "receiving". The question as to which of these devices is finally used also depends, inter alia, on the communications channel which is used as the basis for the audio communications system. The present invention thus primarily relates to telecommunications systems, which have a wire-free telecommunications channel. Telecommunications systems having such a structure are, for example, cordless telephones to the DECT standard (Digital European Cordless Telecommunication; cf. (1) European Telecommunication Standard; prETS 300 175-1 . . . 9, October 1992, Parts 1 to 9, ETS-Institute 06921 Sofia Antipoles, France; (2) Nachrichtentechnik Elektronik 42 (Telecommunications Electronics 42) (January/February 1992), No. 1, Berlin; U. Pilger: "Struktur des DECT-Standards" (Structure of the DECT Standard); pages 23 to 29; (3) Philips Telecommunication Review: "DECT, Universal Cordless Access System"; Vol. 49, No. 3, September 1991, pages 68 to 73) or mobile radio telephones to the GSM standard (Groupe Spéciale Mobile Systems for Mobile Communication; cf. Informatik Spektrum (Information Spectrum), Springer Press Berlin, Year 14, 1991, No. 3, pages 137 to 152, "Der GSM-Standard—Grundlage für digitale europäische Mobilfunknetze" (The GSM Standard Basis for digital European mobile radio networks)).

The DECT cordless telephone and the GSM mobile radio telephone are audio communications systems in which block-coded audio signals—for example signals which are coded using the TDMA or CDMA method (Time Division Multiple Access or Code Division Multiple Access)—are processed. The message transmitted using these telephones as a rule comprises, according to the above definition of message types, a mixture of continuous and non-continuous signals. This signal mixture is in this case produced by the use of analog/digital and digital/analog converters.

FIG. 1 shows a DECT cordless telephone having a cordless base station FT (Fixed Termination) to which a maximum of twelve cordless mobile sections (PT1 . . . PT12 (Portable Termination) are assigned for cordless telecommunication via a radio channel FK. Cordless base stations designed in such a way have been introduced to the market using the product name "Gigaset 952"—cf. DE-Z: the German journal Funkschau December 1993, pages 24 and 25; "Digitale Freiheit—Gigaset 952: Das erste DECT-Telefon" (Digital freedom—Gigaset 952: The first DECT telephone); author: G. Weckwerth—1993. This design was essentially also known before this from DE-Z: the German journal Funkschau October 1993; pages 74 to 77; title: "Digital kommunizieren mit DECT-DECT-Chipsatz von Philips" (Communicate digitally using the DECT-DECT chip set from Philips); author: Dr. J. Nieder and WO 94/10812 (FIG. 1 with the associated description).

FIG. 2 shows the principle of the design of the DECT-specific cordless mobile section PT1 . . . PT12, as is used for the transmission of voice messages in the cordless telephone. Cordless mobile sections designed in such a way have likewise been introduced to the market using the product name "Gigaset 952"—cf. DE-Z: the German journal Funkschau December 1993, pages 24 and 25; "Digitale Freiheit—Gigaset 952: Das erste DECT-Telefon" (Digital freedom—Gigaset 952: The first DECT telephone); author: G. Weckwerth—1993. This design was essentially also known before this from DE-Z: the German journal Funkschau October 1993; pages 74 to 77; title: "Digital kommunizieren mit DECT-DECT-Chipsatz von Philips" (Communicate digitally using the DECT-DECT chip set from Philips); author: Dr. J. Nieder and WO 94/10812 (FIG. 1 with the associated description).

Block-oriented coding methods (for example TDMA methods) are used for the transmission of voice and/or music signals (audio signals) with the DECT cordless telephone, in order on the one hand to use a correlation between signal sections which follow one another in time for data reduction and/or, on the other hand, to carry out block-oriented error protection by means of parity bits. If the transmission of the digitally coded signals is disturbed, then bit errors obviously occur which can be compensated for, if the error rate is low, by the redundancy mechanisms which are assigned to the digitally coded signal. However, if the bit error rates reach higher levels, an error correction is no longer possible and an entire signal block will in consequence be identified as being faulty and will be rejected. There are a number of options at the receiver end for coping with such signal blocks which have been identified as being faulty and have been rejected.

A first option, which is disclosed in WO 94/10769, comprises "squelching" the appropriate signal block which has been identified as being faulty, that is to say changing the code in an appropriate manner, for example by means of a sequence of zeros. This method is now used in digital DECT cordless telephones, such as Gigaset 952.

A second option for error correction is to assume that the error which has occurred is only minor. However, in this case, it is necessary to distinguish whether the algorithm can be used to identify the importance of the respectively disturbed bits. In the case of conventional linear coding, for example, a disturbed less significant bit (LSB=Least Significant Bit) would scarcely produce any audible errors, while an incorrectly set more significant bit (MSB=Most Significant Bit) would produce severe sudden changes in the transmission signal and thus crackling-like interference. Meanwhile, it is not possible in all cases to identify directly how severe the specific interference to be expected will be.

An entirely different way to correct errors in disturbed audio signals is proposed in the documents:

(1) A. Papoulis: "A new algorithm in Spectral Analysis and Band-Limited Extrapolation"; IEEE Transactions on Circuits and Systems, Volume 22 (9), pages 735 ff., 1975 and (2) R. Sottek: "Modelle zur Signalverarbeitung im menschlichen Gehör" [Models for signal processing in human hearing]; Thesis at the Institute for Electrical Telecommunications, RWTH Aachen 1993.

A method is known from each of the cited documents, in which signal errors in the audio signal which are caused by interference are masked by interpolation of the signal. The disadvantages in the case of this method are, on the one hand, the high technical complexity which, under some circumstances, demands the complete computation power of a currently marketed digital signal processor (DSP=Digital Signal Processor) and, on the other hand, makes the algorithmic delay of the signal necessary, if processing is carried out in the frequency domain using Fourier transformation. This delay would not be tolerable, for example, in the case of telephony, particularly cordless telephony.

A method for the transmission of digital audio signals is disclosed in German reference DE-41 11 131 A1, in which a substitution signal which is correlated with the signal is generated and buffer-stored for processing of the signals, at least one first incorrectly transmitted signal section is determined in the signal, the first signal section of the signal is replaced by the substitution signal, and substitution-dependent artefacts in the signal are suppressed.

SUMMARY OF THE INVENTION

The object on which the invention is based is to improve the transmission quality of block-coded audio signals in audio communications systems when transmission errors occur, in such a manner that the requirement for computation power and thus the costs are minimal, and, in particular, no additional delay or adverse effect occurs to the audio signal to be transmitted.

In general terms the present invention is a signal processing method for block-coded audio signals of a communications system. A substitution signal which is correlated with the audio signal is generated and buffer-stored. At least one first, incorrectly transmitted signal section is determined in the audio signal. The first signal section of the audio signal is replaced by the substitution signal. Substitution-dependent artefacts in the audio signal are suppressed. A filter function is produced to suppress the artefacts, as a result of which the substituion-dependent artefacts in the audio signal are filtered such that the audio signal (on the basis of psycho-acoustic aspects) is essentially maintained.

Advantageous developments of the present invention are as follows.

The audio signal is digitally filtered.

The audio signal is a voice signal.

The substitution signal is generated from a second, correctly transmitted signal section of the audio signal, which is transmitted immediately before the first signal section.

In the event of first signal sections which occur essentially continuously, the suppression of the substitution-dependent artefacts is changed in time. The audio signal is masked out if the first signal sections, which occur essentially continuously, exceed a predetermined time duration. The present invention is also an application of the method as described above in a DECT-specific cordless telecommunications system having at least one cordless base station and at least one cordless mobile section which is assigned to it.

The present invention is furthermore a signal processing arrangement for block-coded audio signals of a communications system having a first means for generation and buffer-storage of a substitution signal which is correlated with the audio signal. A second means identifies at least one first, incorrectly transmitted signal section in the audio signal. A third means replaces the first signal section of the audio signal with the substitution signal. A fourth means suppresses substitution-dependent artefacts in the audio signal. The fourth means are designed as a filter having a filter function for suppressing the artefacts, which filter filters the substitution-dependent artefacts in the audio signal such that the audio signal (on the basis of psycho-acoustic aspects) is essentially maintained.

Advantageous developments of the present invention are as follows.

The fourth means is a digital filter.

The audio signal is a voice signal.

The first means are designed such that the substitution signal is generated from a second, correctly transmitted signal section of the audio signal, which is transmitted immediately before the first signal section. The second means, the third means and the fourth means form a functional unit such that, in the event of first signal sections which occur essentially continuously, the suppression of the substitution-dependent artefacts is changed in time. The functional unit which is formed from the second to the fourth means is designed such that the audio is masked out if the first signal sections, which occur essentially continuously, exceed a predetermined time duration.

The first means is designed as a first program module, the second means is designed as a second program module, the third means is designed as a third program module and the fourth means is designed as a fourth program module of a digital signal processor.

The digital filter is designed as a first-order recursive filter having a low-pass filter characteristic.

The digital filter additionally has a high-pass element which suppresses artefacts which are produced by the repetition frequency in the event of multiple use of a common signal section for the substitution.

The signal processing arrangement as described above is used in at least one cordless base station and in at least one cordless mobile section, which is assigned to the cordless base station, of a DECT-specific cordless telecommunications system.

The idea on which the invention is based is to replace the pauses in the audio signal which are caused by transmission errors by a pause-specific substitution signal which is generated in advance.

In the simplest case, the substitution signal is generated by the signal section which immediately precedes a given signal section of the audio signal being buffer-stored and, if the given signal section is disturbed, being inserted into the gap which is produced by the disturbance. This procedure may even be used on its own since, in the case of audio signals (music or voice signals), there is a high level of correlation between signal sections which are closely adjacent to one another in time.

The reason for this is the fact that the mechanisms which produce volume (for example oscillation of chords in the case of music production, movements in the vocal tract in the case of voice production, etc.) have a certain amount of mechanical inertia. If signal sections of the audio signal which follow one another in the order of magnitude of 10 to 20 ms are compared, then a very high level of similarity is almost always found in the time signal (FIG. 3).

Alternatively, it is also possible to extend the generation of the pause-specific substitution signal initially over a plurality of signal sections which precede the given signal section of the audio signal successively in time, and to buffer-store them, and then in the case of a disturbed given signal section—to close the gap in the audio signal, which gap is caused by the disturbance, in the course of optimized continuity matching which is carried out by comparison of the signal section end of the last correctly transmitted signal section with that start of a substitution signal in the buffer-stored substitution signal which best matches this signal section end.

However, the replacement of the faulty signal section by preceding signal sections using one of the methods described above leads (even in the case of the method using optimized continuity matching) to the problem that discontinuities can occur in the audio signal at the insertion points because of the unknown phase of signal sections of the audio signal (FIG. 4). The simple determination of a fundamental frequency of the audio signal in order, for example, continuously to match the signal section to be inserted to the preceding section is impossible in the case of voice signals in telephony because this voice fundamental frequency—which is in the frequency spectrum between 160 and 200 Hz—is filtered out by a high-pass filter (high-pass filtering at 300 Hz). On the other hand, it is possible to place signal sections alongside one another continuously only when the phases of the individual frequency elements are also known, in addition to the spectral distribution. However, this in turn is dependent on continuous spectral analysis—for example using Fourier—which, however, is impossible because of the already mentioned computational complexity.

The discontinuities mentioned above also lead to audible crackling in the audio signal transmission being audible. A low-pass filter is preferably used to suppress this high-frequency interference, for example by suppressing higher spectral elements in the Fourier transform of the step function. The low-pass filter has a smoothing effect in the time domain, while unnatural high-frequency elements are attenuated in the frequency domain. The adverse affect caused by this to the audio signal to be transmitted is tolerable if the low-pass filter, which is preferably designed as a digital filter, does not chop the audio signal too severely. The tuning of the filter can thus be regarded as a compromise, which is optimized on a psycho-acoustic basis. Furthermore, it is a requirement that the filter can be switched on and off without disturbances.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 3:
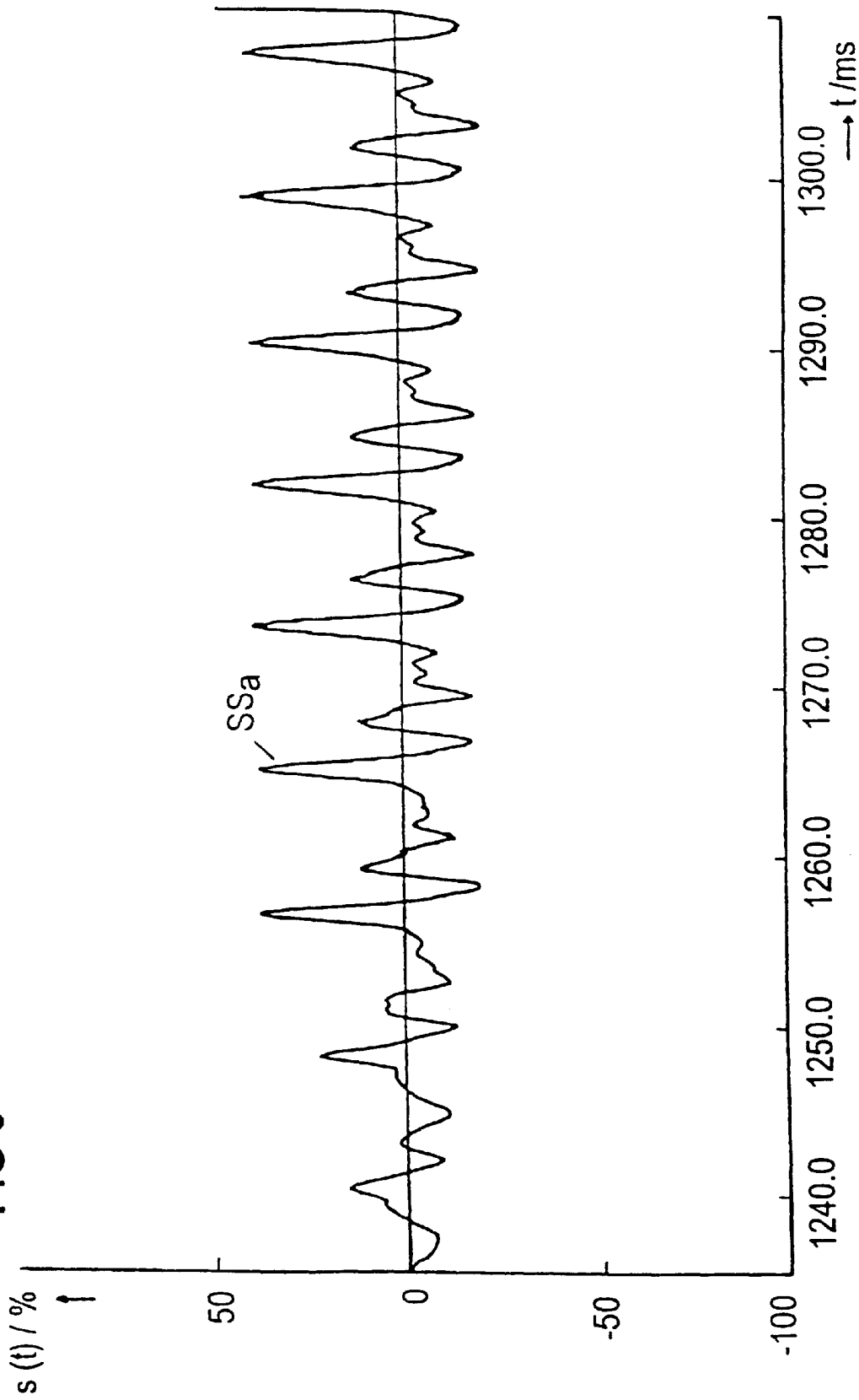
FIG. 3 shows a voice signal for a spoken "a" split into a plurality of time sections.

FIG. 3 shows the time waveform of a voice signal $SS_a$ for the spoken "a", which is split into a plurality of (10 ms) signal sections. The similarity of adjacent time sections can be seen in this time division of the voice signal $SS_a$. This correlation between sub-elements of the voice signal $SS_a$ which are close to one another is a result of the fact that the volume producing mechanisms (movements in the vocal tract) have a certain amount of mechanical inertia.

Figure 4:
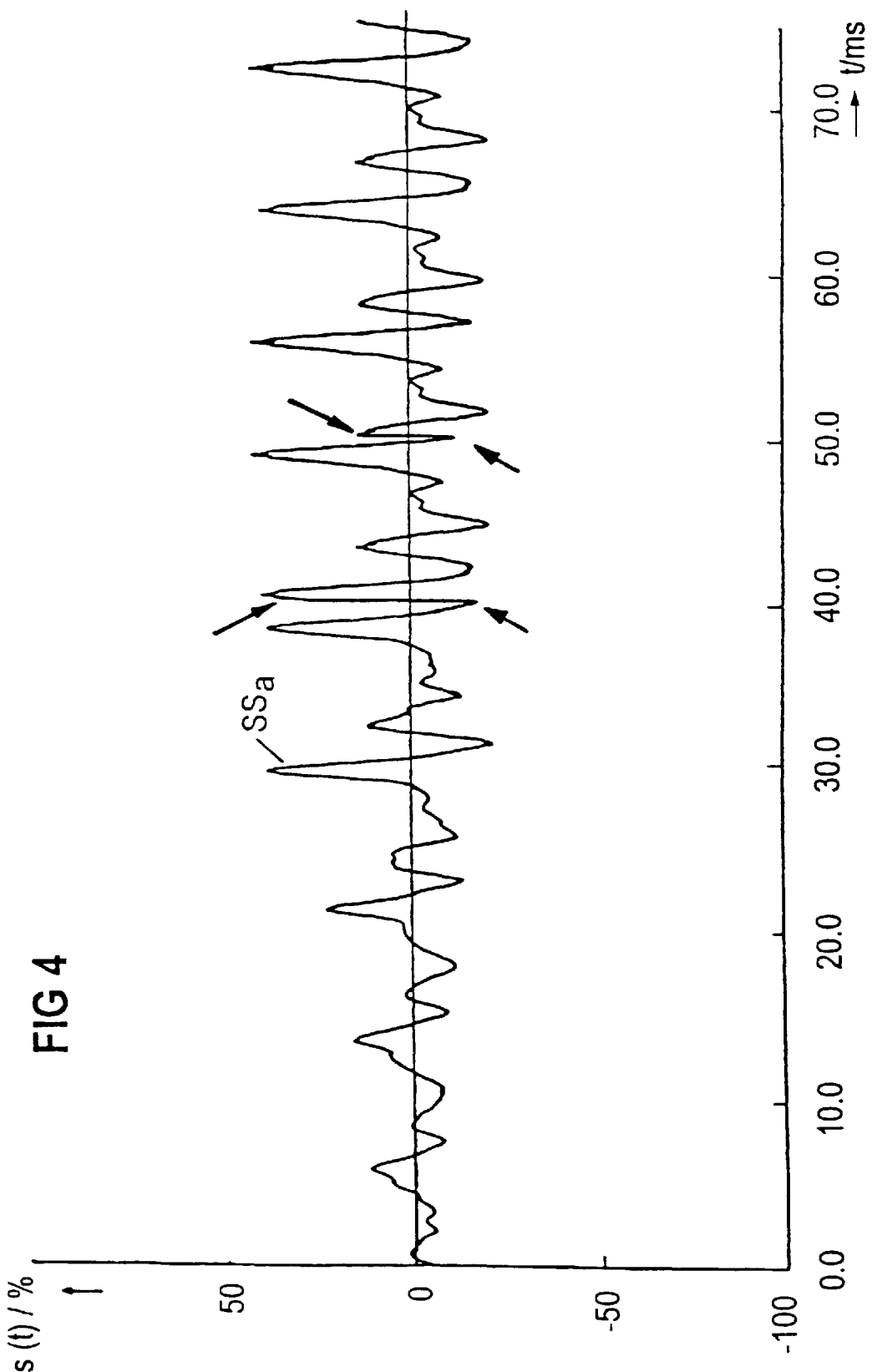
FIG. 4 shows the occurrence of discontinuities in the voice signal when time sections are replaced (arrows)

On the basis of the voice signal $SS_a$ for the spoken "a" according to FIG. 3, FIG. 4 shows the same voice signal $SS_a$ for a different time axis. In the case of the voice signal according to FIG. 4, a time section in the time period between 40 and 50 ms has been replaced by copying the preceding time section. This substitution has resulted in discontinuities at the points marked by the arrows, which can be heard as crackling-like interference in the electro-acoustic signal conversion.

Figure 1:
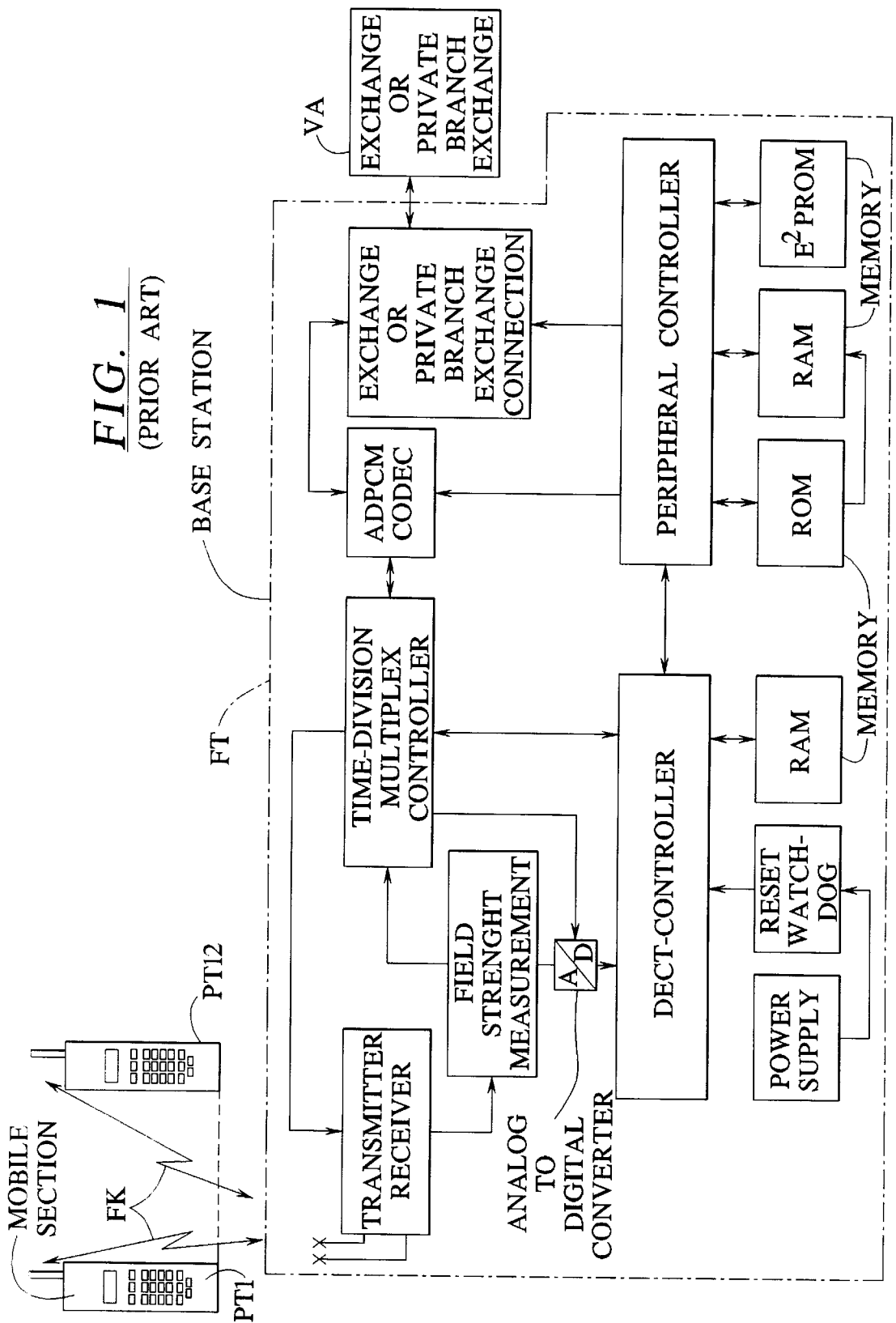
FIG. 1 depicts a DECT cordless telephone.
Figure 2:
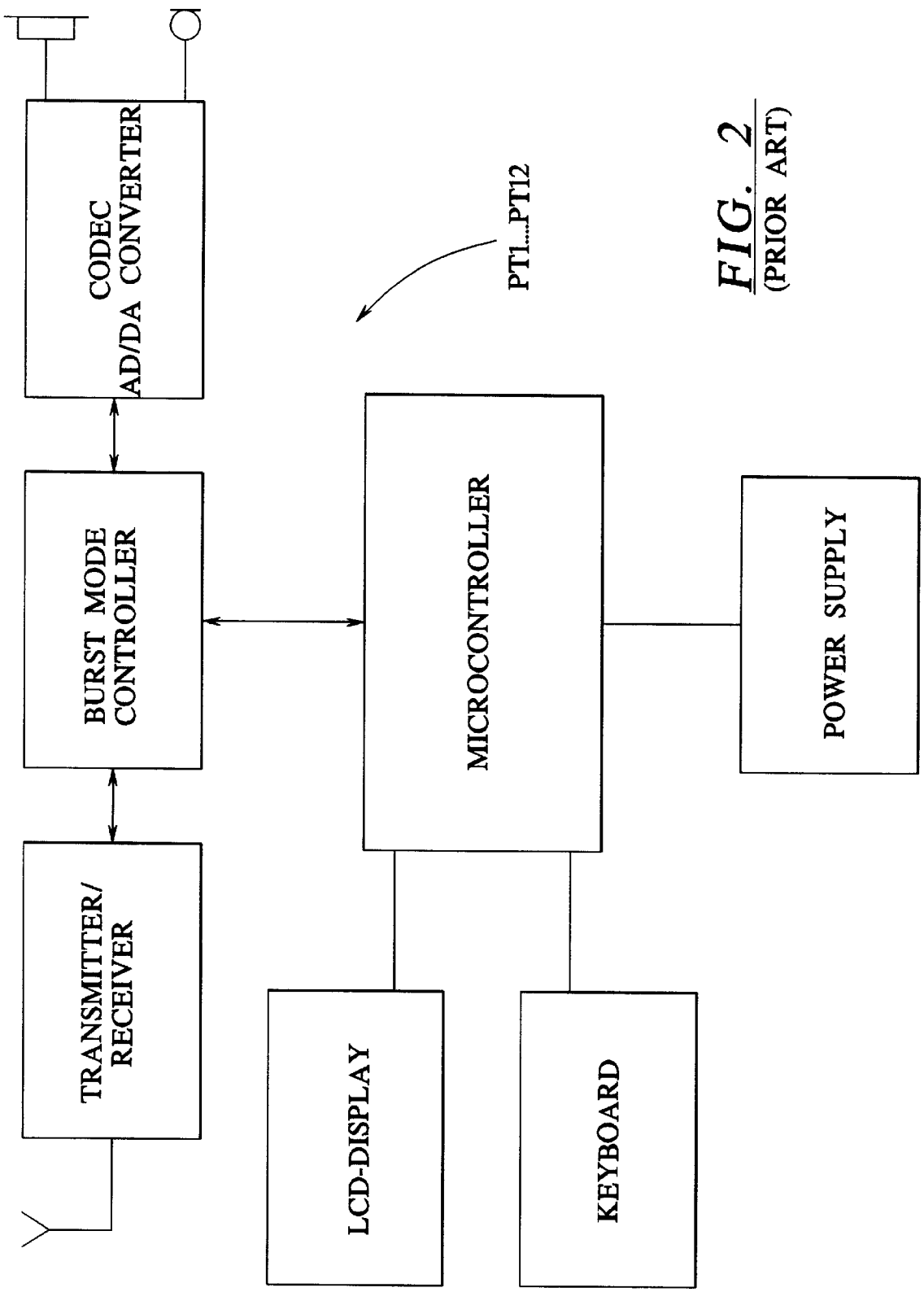
FIG. 2 depicts the principle of the design of the DECT—specific cordless mobile section.
Figure 5:
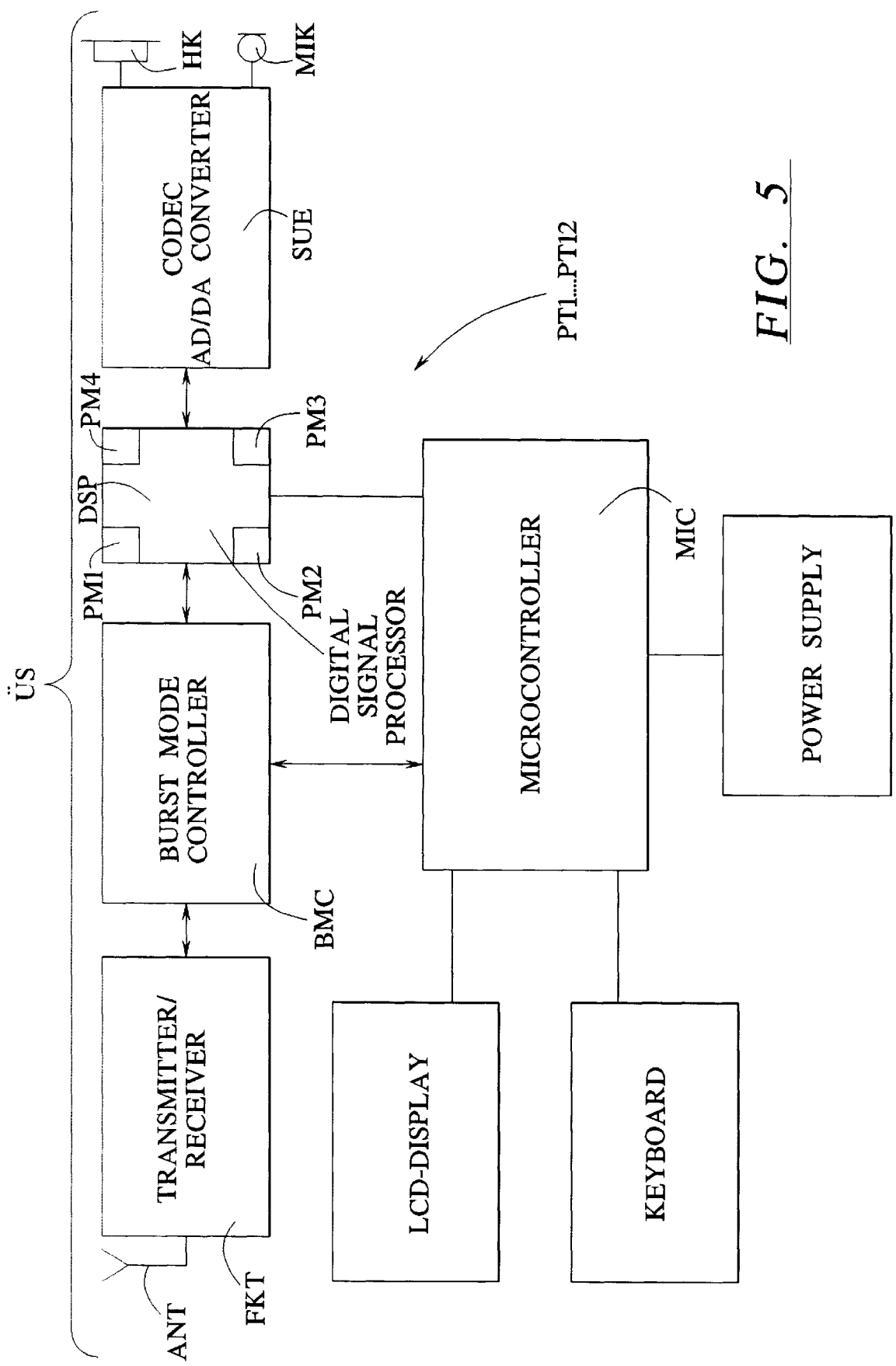
FIG. 5 shows, based on FIG. 2, the modified topology of the cordless mobile section PT in order to improve the transmission quality of TDMA-specific (Time Division Multiple Access), DECT voice signals in DECT cordless telephones when transmission errors occur.

On the basis of FIG. 2, FIG. 5 shows the modified topology of the cordless mobile section PT for improving the transmission quality of TDMA-specific (Time Division Multiple Access), DECT voice signals in DECT cordless telephones when transmission errors occur. The transmission errors frequently occur in the boundary regions when DECT cordless telephone radio messages are being transmitted, so that DECT-specific burst and information losses occur in these regions. Because of this, the modified cordless mobile section PT has a digital signal processor DSP which is arranged on a transmission path US of the cordless mobile section PT—from an antenna ANT with a downstream radio section FKT (transmitter/receiver) to an earpiece HK in the receiving direction and from a microphone MIK to the antenna ANT in the transmitting direction—between a signal control device BMC (Burst Mode Controller) and a signal conversion device SUE (Codec, AD/DA converter). The digital signal processor DSP is in this case controlled by a function/sequence control device MIC (DECT microcontroller) which is specific to the mobile section. In order that the digital signal processor DSP can improve the transmission quality of the DECT voice signals, which are transmitted partially disturbed on the transmission path US, a plurality of program modules are assigned to the digital signal processor DSP, (1) a first program module PM1 for generation and buffer-storage of a substitution signal which is correlated with the voice signal,
(2) a second program module PM2 for determination of at least one first, incorrectly transmitted signal section in the voice signal,
(3) a third program module PM3 for replacement of the first signal section of the voice signal by the substitution signal, and
(4) a fourth program module PM4 for suppression of substitution-dependent artefacts in the DECT voice signal.

While the first three modules PM1, PM2, PM3 detect and evaluate the said special features which are specific to the voice signal under the control authority of the function/sequence control device MIC, the discontinuities which occur in the DECT voice signal during the evaluation are filtered out digitally by the fourth program module PM4. In its preferred embodiment, the fourth program module PM4 is therefore just a digital filter. The sudden discontinuities at the junction points of the time signal sections are smoothed out by the digital filter.

Figure 6:
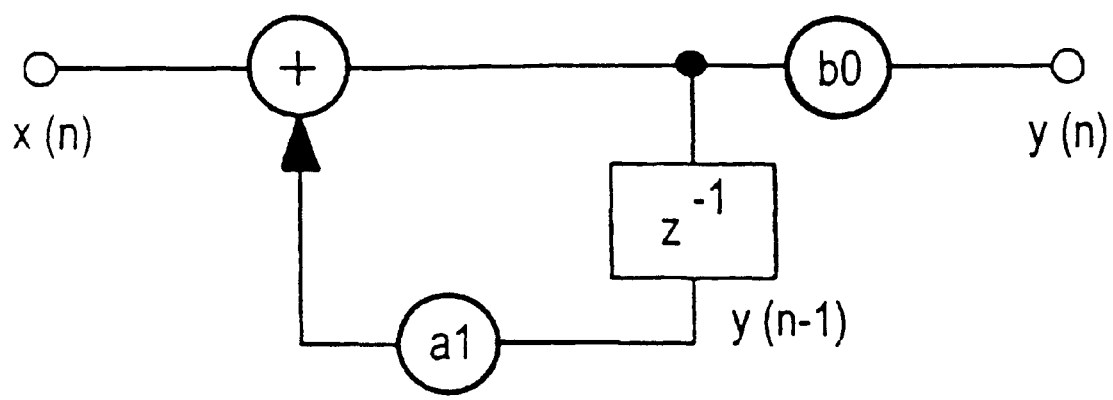
FIG. 6 shows the design of a simple filter for suppressing substitution-dependent artefacts in the voice signal.

FIG. 6 shows the design of a digital filter which is implemented by the program module PM4 according to FIG. 5. In its simplest form, this digital filter is designed as a first-order recursive filter (IIR-Filter; Infinite Impulse Response-Filter). The recursive filter has a filter function $H(\omega)$, which,
(1) at an angular frequency $\omega=0$, has the function value $H(\omega=0)=b_0 * 1/(1-a_1)$ and
(2) at an angular frequency $\omega=\pi$, has the function value $H(\omega=\pi)=b_0 * 1/(1+a_1)$.

In consequence, unique design of the filter is possible. If the coefficient $a_1$ is in the value range between 0 and 1 ($0<a_1<1$), then the recursive filter is a low-pass filter. Using the relationship $b_0=(1-a_1)$ and a value $a_1=0.8$, the following filter function values result for $\omega=0$, $\omega=\pi/8$ and $\omega=\pi$: $H(\omega=0)=1$, $H(\omega=\pi/8)=0.5$ and $H(\omega=\pi)=0.111$.

Figure 7:
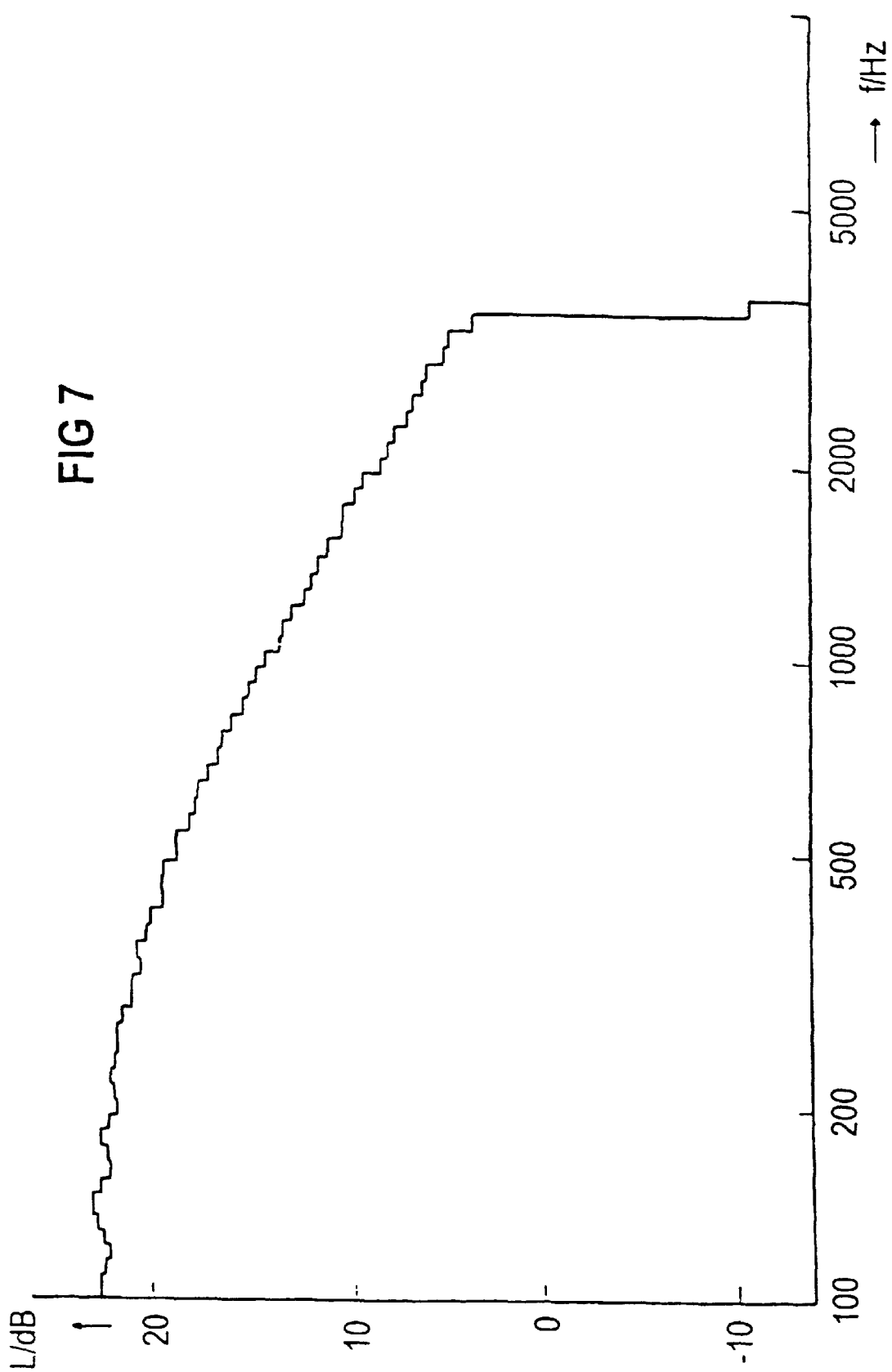
FIG. 7 shows the measured transfer function of an actual low-pass filter (first-order recursive filter according to FIG. 6)

FIG. 7 shows the transfer function measured on an actual first-order low-pass filter. The resultant band cut-off at 4 kHz results from the bandwidth of the voice signal which is transmitted with the DECT-specific cordless mobile section PT at a sampling rate of 8 kHz. This filter produces a signal attenuation of just 20 dB at the highest frequencies.

Figure 8:
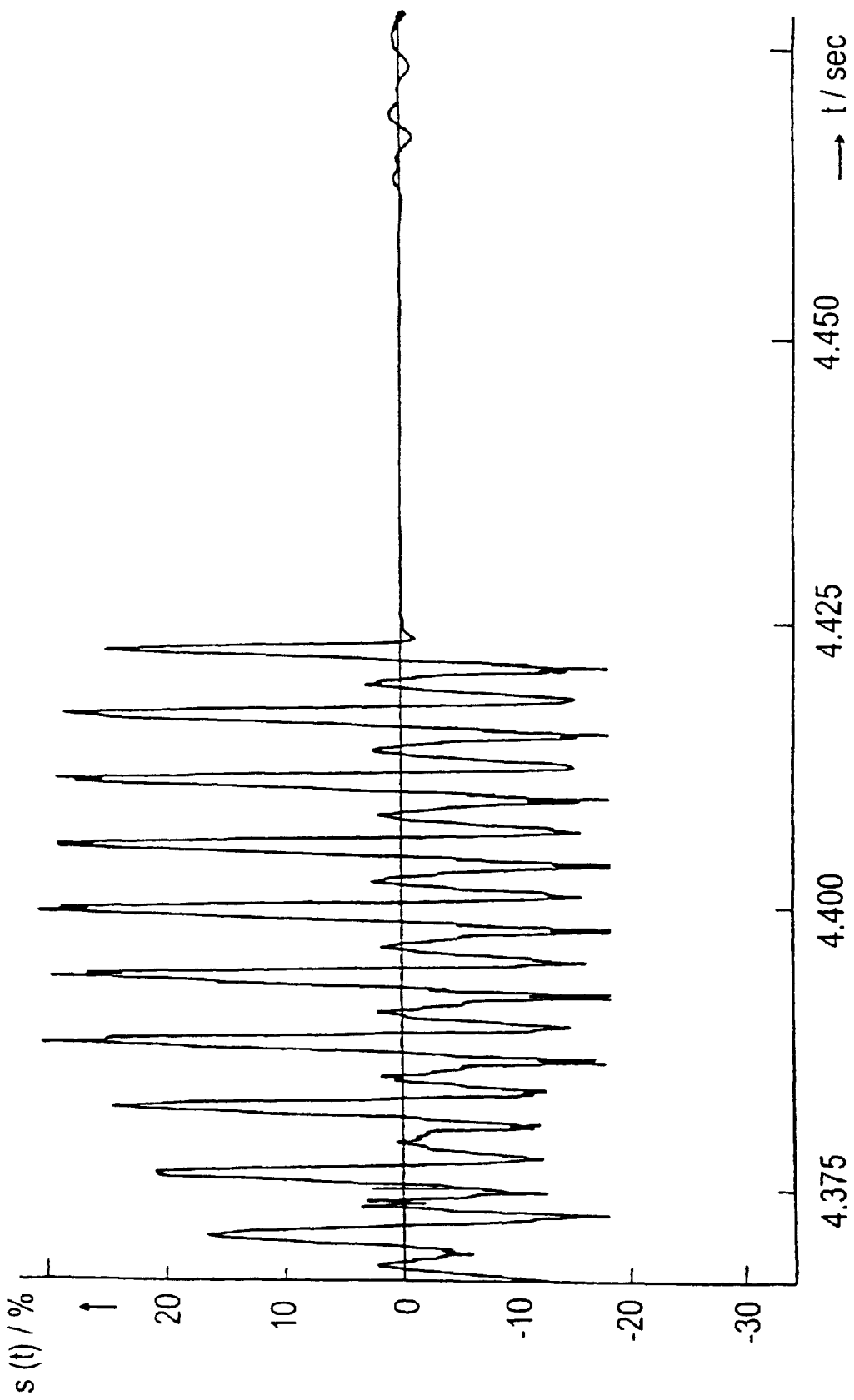
FIG. 8 shows a DECT voice signal which is disturbed over three (10 ms) periods.

FIG. 8 shows a voice signal in which the DECT voice signal is disturbed over three (10 ms) periods (time period on the time axis between 4425 ms and 4455 ms). The individual (10 ms) period corresponds to the time duration of a TDMA time-division multiplex frame in the DECT cordless signal transmission.

Figure 9:
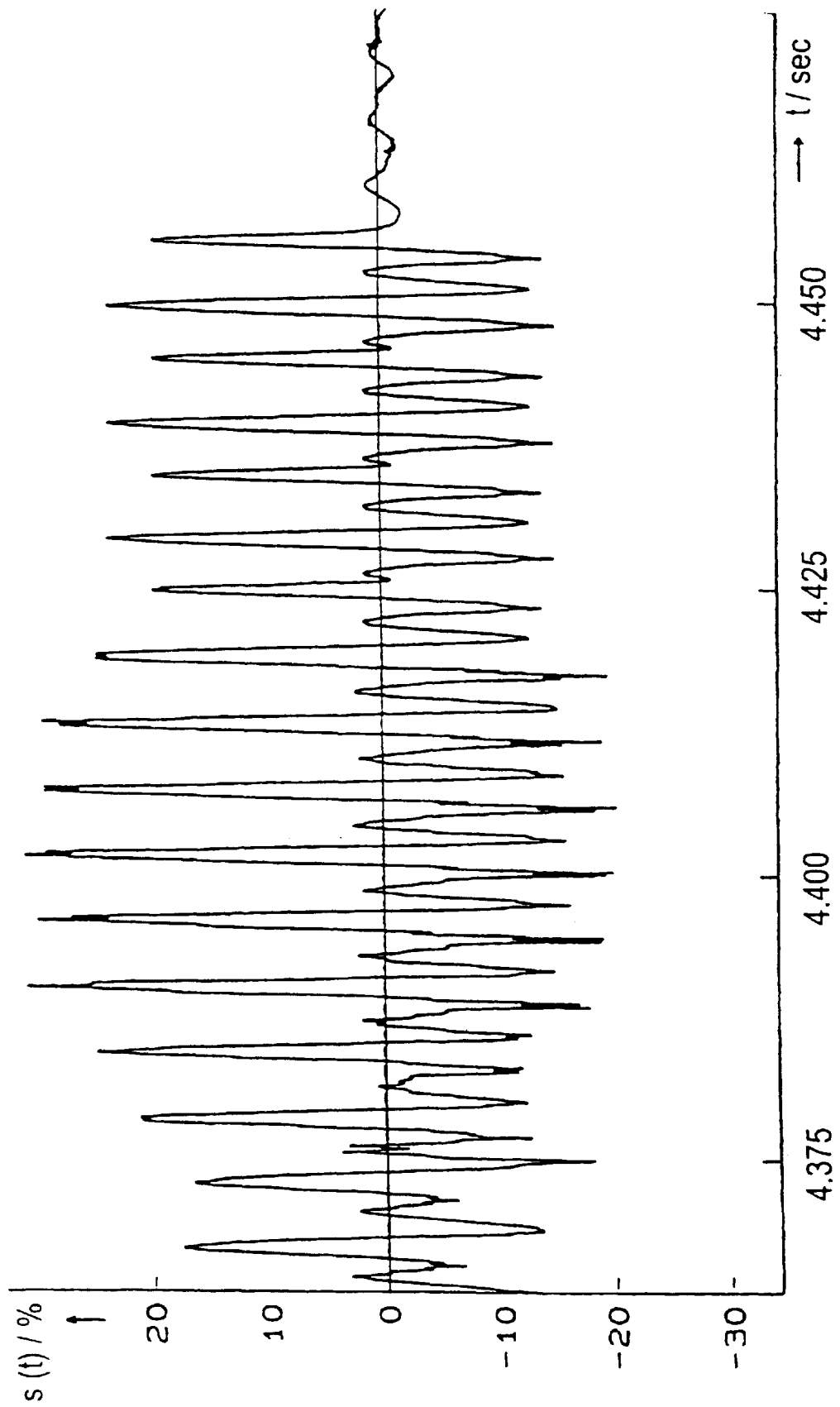
FIG. 9 shows the DECT voice signal processed for the three (10 ms) periods according to FIG. 8.

If the signal which is illustrated in FIG. 8 is transmitted on the transmission path US, which is illustrated in FIG. 5, of the cordless mobile section PT, then the modified voice signal which is illustrated in FIG. 9 finally results at the output of the signal conversion device SUE according to FIG. 5. The difference which results in this case from the original voice signal according to FIG. 8 is the sole result of the processing of the original voice signal in the digital signal processor DSP according to FIGS. 5 and 6. The functional steps which are carried out in the digital signal processor DSP on the basis of the program modules PM1 . . . PM4 are, in this case:
(I) The determination of at least one incorrectly transmitted signal section in the voice signal. With respect to the voice signal according to FIG. 8, these are the three disturbed (10 ms) signal sections.
(II) The buffer-storage of the last correctly transmitted signal section of the voice signal (generation of a substitution signal).
(III) The replacement of the three (10 ms) signal sections of the original voice signal by the buffer-stored substitution signal.
(IV) The application of the filter function of the digital recursive filter according to FIG. 6 to the modified voice signal produced according to steps (1) . . . (3).

The digital signal processor DSP requires only the last buffer-stored sample value for the last functional step—the calculation of the filter function. The two coefficients $a_1$, $b_0$ then just need to be converted.

If a number of signal sections are disturbed in the voice signal, as in the case of the voice signal according to FIG. 8, then this error is corrected by appropriate insertion of the last signal which was transmitted without interference, at a plurality of times. This method can, of course, be used only to a limited extent—for (10 ms) signal sections, this limit is about (empirical values) a time duration of 50 ms. It is pointless to use the method when error-free voice signals can no longer be received. Continuous repetition of the last disturbed signal section would lead to an unnatural audible impression. If the limit stated above is exceeded, then the described method is modified such that, after a number of disturbed signal sections have been replaced by the last correctly transmitted signal section, the voice signal is subsequently masked out with a time constant of, for example, 20 ms. This operation can be carried out by the digital signal processor DSP without any major computation complexity. Alternatively, it is also possible in the event of relatively long-lasting transmission errors to design the digital filter to be variable with time. This can be done, for example, by the cut-off frequency of the filter being reduced and the effect of the filter thus being enhanced. As a result of the digital signal processor DSP characteristics described above, this processor can distinguish how many signal sections (DECT bursts) have been transmitted incorrectly, and can accordingly react differently, depending on the duration of the disturbed signal section.

In the event of multiple repetition of one and the same voice signal, it is also possible for elements to be produced in the signal spectrum which correspond to the period of the signal section (time section) (for example spectral elements of 100 Hz in the (10 ms) signal sections). These artefacts are partially attenuated by the high-pass response of the rest of the transmission path US of the cordless mobile section PT according to FIGS. 2 and 5 (for example by the frequency response in the ear-piece HK). However, alternatively, it is also possible to provide a high-pass filter component in the digital filter as well. This high-pass filter characteristic filters out the low-frequency signal elements. This procedure further assists in making the signal which is being dealt with—as hearing tests have shown—more realistic. In the case of telephony, it is in any case known for the low frequencies, which correspond to this frequency band, not to be transmitted.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A signal processing method for block-coded audio signals of a communications system, comprising the steps of:
   a) generating and buffer-storing a substitution signal which is correlated with the audio signal;

b) determining at least one first, incorrectly transmitted signal section in the audio signal;

c) replacing one signal sections of the audio signal by the substitution signal for a calculated replacement durations d) producing a filter function; and e) suppressing substitution-dependent artefacts in the audio signal using the filter function, as a result of which the substitution-depended artefacts in the audio signal are filtered such that the audio signal, based on psycho-acoustic aspects, is substantially maintained, the filter function being effected by a time variant filter, in a digital signal processor which is adapted for smoothing sudden discontinuities that result from replacement of said one or more signal sections with said substitution signal as a function of said replacement duration.

2. The method as claimed in claim 1, wherein the audio signal is digitally filtered.

3. The method as claimed in claim 1, wherein the audio signal is a voice signal.

4. The method as claimed in claim 1, wherein the substitution signal is generated from a second, correctly transmitted signal section of the audio signal, which is transmitted immediately before the first signal section.

5. The method as claimed in claim 1, wherein, if first signal sections occur substantially continuously, the suppression of the substitution-dependent artefacts is changed in time.

6. The method as claimed in claim 5, wherein the audio signal is masked out if the first signal sections, which occur substantially continuously, exceed a predetermined time duration.

7. The method as claimed in claim 1, wherein the method is used in a DECT (Digital European Cordless Telephone)-specific cordless telecommunications system having at least one cordless base station and at least one cordless mobile section which is assigned to the base station.

8. The method as claimed in claim 1, wherein said time variant filter can be switched on and off while producing no disturbances.

9. A signal processing arrangement for block-coded audio signals of a communication system, comprising:

a first system for generation and buffer-storage of a substitution signal which is correlated with an audio signal;

a second system for identification of at least one first, incorrectly transmitted signal section in the audio signal;

a third system for replacement of one or more signal sections of the audio signal with the substitution signal for a calculated replacement duration;

a fourth system for suppression of the substitution-depended artefacts in the audio signal such that the audio signal based on psycho-acoustic aspects, is substantially maintained, said filter being a time variant filter, in a digital signal processor which is adapted for smoothing sudden discontinuities that result from replacement of said one or more signal sections with said substitution signal as a function of said replacement duration.

10. The signal processing arrangement as claimed in claim 9, wherein the audio signal is a voice signal.

11. The signal processing arrangement as claimed in claim 9, wherein the first system effects generation of the substitution signal from a second, correctly transmitted signal section of the audio signal, which is transmitted immediately before the first signal section.

12. The signal processing arrangement as claimed in claim 9, wherein the second system, the third system and the fourth system form a functional unit such that, when first signal sections occur, suppression of the substitution-dependent artefacts is changed in time.

13. The signal processing arrangement as claimed in claim 12, wherein the functional unit is structured such that the audio signal is masked out if the first signal sections, which occur, exceed a predetermined time duration.

14. The signal processing arrangement as claimed in claim 9, wherein the arrangement is used in at least one cordless base station and/or at least one cordless mobile section, which is assigned to the cordless base station, of a DECT (Digital European Cordless Telephone)-specific cordless telecommunications system.

15. The signal processing arrangement as claimed in claim 9, wherein said time variant filter can be switched on and off while producing no disturbances.

16. The signal processing arrangement as claimed in claim 9, wherein the fourth system forms a digital filter.

17. The signal processing arrangement as claimed in claim 16, wherein the arrangement further comprises a digital signal processor having first, second, third and fourth program modules and wherein the first system is the first program module, the second system is the second program module, the third system is the third program module and the fourth system is the fourth program module of the digital signal processor.

18. The signal processing arrangement as claimed in claim 16, wherein the digital filter is a first-order recursive filter having a low-pass filter characteristic.

19. The signal processing arrangement as claimed in claim 18, wherein the digital filter additionally has a high-pass element which suppresses artefacts which are produced by repetition frequency for multiple use of a common signal section for the substitution.

20. A signal processing method for block-coded audio signals of a message system, comprising the steps of:

generating a substitution signal that is correlated with an audio signal of said audio signals;

temporarily storing said substitution signal;

determining a first erroneously transmitted signal section in said audio signal;

replacing said first erroneously transmitted signal section by said substitution signal, which thereby creates undesirable substitution-conditioned artefacts that arise at an insertion point where said substitution signal is inserted into said audio signal due to phase differences between said replaced signal and said substitution signal; and suppressing said substitution-conditioned artefacts of said audio signal utilizing a filter function, wherein said filter function smooths said substitute-conditioned artefacts thereby maintaining psycho-acoustic quality.

21. A signal processing arrangement for block-coded audio signals of a communication system, comprising:

a first system for generation and buffer-storage of a substitution signal which is correlated with an audio signal of said audio signals;

a second system for identification of at least one first, incorrectly transmitted signal section in the audio signal;

a third system for replacement of a first signal section of said audio signal with said substitution signal which thereby creates undesirable substitution-conditioned artefacts in said audio signal that arise at an insertion point where said substitution signal is inserted into said audio signal due to phase differences between a replaced signal and said substitution signal;

a fourth system for suppression of said substitution-conditioned artefacts, said fourth system having a filter that smooths said substitute-conditioned artefacts thereby maintaining psycho-acoustic quality.

* * * * *